UNITED STATES PATENT OFFICE.

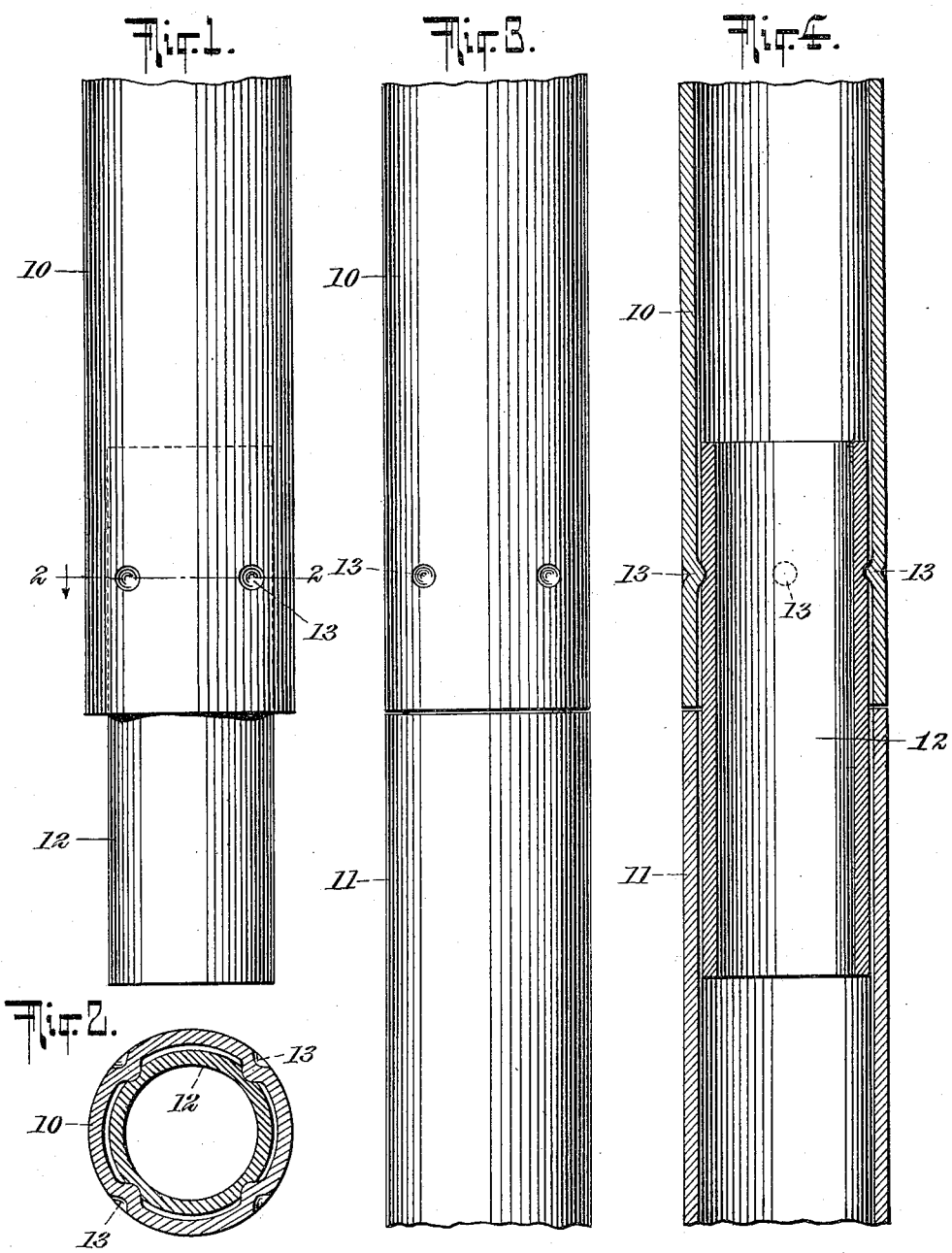

JOHN W. KENNY, OF NEW YORK, N. Y.

CONCRETE-CASING.

1,157,226.  Specification of Letters Patent.  Patented Oct. 19, 1915.

Application filed January 26, 1912. Serial No. 673,535.

*To all whom it may concern:*

Be it known that I, JOHN W. KENNY, a citizen of the United States, residing at the city of New York, borough of Brooklyn, Kings county, in the State of New York, have invented new and useful Improvements in Concrete-Casings, of which the following is a full, clear, and exact specification.

My invention relates to improvements in casings for concrete structures, and the same has for its object more particularly to provide a simple, efficient and reliable casing which may readily be extended to any desired height and which will properly insure the alining of the several parts when the same are arranged in end to end relation one upon the other.

Further, said invention has for its object to provide a casing consisting of a plurality of tubular elements so arranged and constructed that the same may be disposed one upon the other with their adjoining ends or edges in contact, and said ends or sections held against lateral movement relatively to each other in order to produce a continuous casing having a smooth, unbroken, outer surface.

Further, said invention has for its object to provide a casing consisting of a plurality of tubular elements, each provided at one end with a sleeve section adapted to be fitted into the opposite end of a corresponding tubular section.

Further said invention has for its object to provide a casing consisting of a plurality of tubular sections each provided at one end with a short sleeve section arranged partly within and partly without the tubular section and having the portion thereof arranged within said tubular section permanently secured thereto.

To the attainment of the aforesaid objects and ends, my invention consists in the novel details of construction, and in the combination, connection and arrangement of parts hereinafter more fully described, and then pointed out in the claims.

In the accompanying drawings forming part of this specification, wherein like numerals of reference indicate like parts, Figure 1 is a side view showing a portion of a tubular section with a sleeve member secured in one end thereof; Fig. 2 is a section taken on the line 2—2 of Fig. 1, looking in the direction of the arrow; Fig. 3 is a side view showing two tubular sections disposed one upon the other and maintained in position by the sleeve member; and Fig. 4 is a central vertical section.

In said drawings 10 designates a tubular casing section which may be of any desired diameter and length, and 11 denotes a similar section arranged in position below the casing section first named.

12 denotes a short sleeve section having an outer diameter slightly smaller than the interior diameter of said casing section 10 in order that the same may be readily fitted into one end of said casing section. The sleeve section 12 may be of any desired length, but by preference I arrange the same within its respective casing section so that about one-half thereof will be within said casing section and about one-half thereof projecting out of the same.

As the sleeve section is designed to maintain the abutting ends of the casing sections in register, in order to produce a continuous casing having a smooth, unbroken, outer surface, it is not necessary to secure the end of the sleeve section 12 within the casing section 10 with a view to resisting any longitudinal strain or pressure. I have therefore devised an effective method of securing a sleeve section within a casing section which is not only inexpensive but also easy to carry into effect. To secure said sleeve section 12 within the casing section 10 I first adjust the sleeve section and the casing section to which it is to be secured upon a suitable mandrel and then punch equally spaced semicircular projections or indentations 13 in said casing section and cause the inner rounded portions of said indentations or projections to be driven into the outer surface of the sleeve section 12, and thus serve to hold said sleeve section permanently and rigidly secured therein.

By means of my invention, I am thus enabled to provide a casing composed of a plurality of tubular sections, each of which is provided at one end with a sleeve 12. The said casing sections do not, therefore, require a separate or independent guide or sleeve which must first be inserted between each pair of pipe ends in order to maintain the contiguous ends thereof in proper end to end relation and produce a casing having a perfectly smooth, unbroken, outer surface. Further, by reason of my construction, I am enabled to produce a joint for the casing sections which is not apt to get out of order nor likely to be damaged in the handling of the tube sections.

Having thus described my invention, what I claim and desire to secure by Letters Patent, is:

1. In a sectional casing adapted to be filled with concrete or the like, the combination of a plurality of casing sections with a sleeve section permanently secured in one end of each of said casing sections and having a projecting portion adapted to be loosely fitted into the opposite end of an adjoining casing section, the projecting portion of said sleeve section being free from positive connection with said adjoining casing section and spaced therefrom whereby to allow of the lateral adjustment of said casing sections relative to each other, and to permit of the entry of concrete between said sleeve and said casing section in order to hold the several parts duly secured together, substantially as specified.

2. In a sectional casing adapted to be filled with concrete or the like, the combination of a plurality of casing sections with a sleeve disposed in one end of each of said casing sections and arranged partly within and partly without said casing section, and means for permanently securing the inclosed end of said sleeve to said casing end in position to receive loosely the end of an adjoining casing section, the projecting portion of said sleeve section being free from positive connection with said adjoining casing section and spaced therefrom whereby to allow of the lateral adjustment of said casing sections relative to each other, and to permit of the entry of concrete between said sleeve and said casing section in order to hold the several parts duly secured together, substantially as specified.

3. In a sectional casing adapted to be filled with concrete or the like, the combination of a plurality of casing sections of uniform internal diameter with a relatively short sleeve section having one end disposed within one end of one of said casing sections, and having its other end projecting beyond the end of said casing section, and a series of inwardly extending projections on said casing section engaging the inclosed portion of said sleeve section whereby to secure said sleeve section in position therein to receive, upon its projecting end, the opposite end of a corresponding casing section, the projecting portion of said sleeve section being free from positive connnection with said adjoining casing section and spaced therefrom whereby to allow of the lateral adjustment of said casing sections relative to each other, and to permit of the entry of concrete between said sleeve and said casing section in order to hold the several parts duly secured together, substantially as specified.

Signed at the city of New York, in the county and State of New York, this nineteenth day of January, nineteen hundred and twelve.

JOHN W. KENNY.

Witnesses:
CONRAD A. DIETERICH,
JOSEPH G. QUINN, JR.

Copies of this patent may be obtained for five cents each, by addressing the "Commissioner of Patents, Washington, D. C."